(No Model.)

A. WALFARD.
TREATMENT OF SPARKLING WINE.

No. 485,248. Patented Nov. 1, 1892.

Witnesses:
E. K. Sturtevant.
O. A. Kibler.

Inventor:
Armand Walfard.
by Richards
Atty.

United States Patent Office.

ARMAND WALFARD, OF RHEIMS, FRANCE.

TREATMENT OF SPARKLING WINE.

SPECIFICATION forming part of Letters Patent No. 485,248, dated November 1, 1892.

Application filed June 5, 1891. Serial No. 395,282. (No model.) Patented in Germany May 3, 1891, No. 60,351.

*To all whom it may concern:*

Be it known that I, ARMAND WALFARD, a citizen of the Republic of France, residing at Rheims, in said Republic, have invented certain new and useful Improvements in the Treatment of Sparkling Wines, of which the following is a full, clear, and exact description, this invention having been patented to me in Germany under date of May 3, 1891, No. 60,351.

The clearing operation performed during the treatment of sparkling wines has for its object to free the wine from the deposit which previously settled against the cork through the shaking up of the wine.

In clearing according to the process heretofore used the workman takes the bottle with one hand and holds it slightly inclined, but always head downward, to avoid the renewed mixing of the deposit with the wine. With the other hand he takes off the clip which holds the cork, and after having, by means of a pair of nippers, drawn the cork until it is almost disengaged from the neck of the bottle he ejects it with a last violent shake, at the same time raising up the bottle, but letting a stream of wine escape, which is intended to carry the sediment which settled against the cork with it and wash the neck of the bottle. The loss of wine occasioned by this operation varies from four to eight per cent. It causes, moreover, quite an appreciable diminution of foam, and consequently a loss of flavor. This process has, besides, the drawback that it can only be performed by experienced workmen, who are at times hard to obtain.

The process forming the subject of this application is adapted to avoid the loss of wine and flavor, at the same time rendering the operation infinitely cleaner, and permits of being performed under superior conditions by any help without previous experience.

In the accompanying drawings I have illustrated a practical means of carrying my process into effect.

Figure 1:
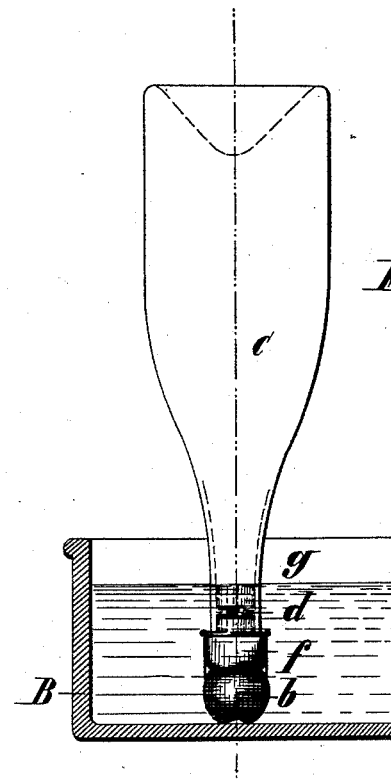
Figure 2:
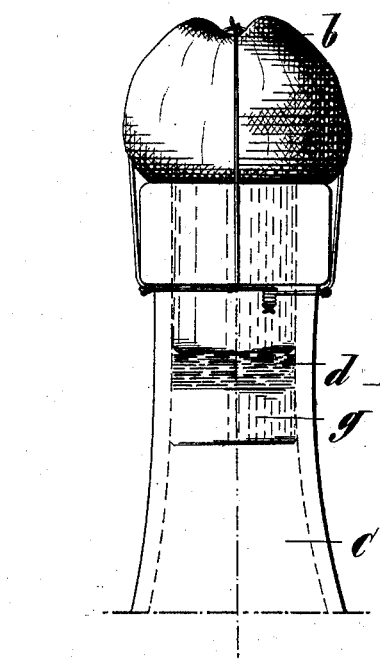

In said drawings, Figure 1 represents a bottle having its neck submerged in a freezing bath, and Fig. 2 is a view of a bottle in an upright position with the cake of ice formed therein.

The bottles, which are brought to the desired condition—*i. e.*, having their sediment gathered against the cork—are placed head downward in a bath of alcohol or any other non-freezing liquid L, contained in a tube B, which is maintained at a temperature of about 15° or 20° centigrade below zero by a freezing-machine or any freezing mixture.

The inverted bottles C are immersed in this bath to one or two centimeters above the ring *f*. (See Fig. 1.) A few minutes in contact with the alcohol at 15° or 20° centigrade will cause the wine which is in the part of the neck which is immersed to freeze, and a small piece of ice *g* is formed of about one centimeter in thickness, which rapidly becomes solid. The bottle is then placed upright, so that the deposit *d*, which is held between the cork and the ice, cannot redescend in the bottle. It suffices that to take off the clip so that the cork contracted by the cold is ejected by the ice *g*, which itself is ejected, together with the sediment *d*, by the gas of the interior C of the bottle.

The process of clearing is thus performed with security, cleanliness, and economy, the loss of wine being less than one per cent. and the loss of gas and flavor being reduced to the minimum, owing to the cooling-off of the wine.

Having thus described my invention, what I claim is—

The herein-described method of removing sediment from wine in bottles, which consists in inverting the same in a non-freezing liquid at a very low temperature, whereby a small cake of ice is formed in the bottle neck, then restoring the bottle to an upright position, then removing the clip, and then agitating the bottle so that the gases generated will eject the cork, sediment, and ice, substantially as specified.

In testimony whereof I have signed this specification in the presence of two subscribing witnesses.

ARMAND WALFARD.

Witnesses:
J. B. RUTHERFORD,
PEARL A. HYEM.